United States Patent [19]

Olaes

[11] Patent Number: 4,759,125
[45] Date of Patent: Jul. 26, 1988

[54] UTENSIL FOR CUTTING AND SERVING PASTRY AND OTHER FOOD PRODUCTS

[76] Inventor: John Olaes, 91 Larkin Avenue, Markham, Ontario, Canada, L3P 4R1

[21] Appl. No.: 30,472

[22] Filed: Mar. 26, 1987

[30] Foreign Application Priority Data

Mar. 17, 1987 [CA] Canada .................................. 532206

[51] Int. Cl.$^4$ ............................................ A21C 15/04
[52] U.S. Cl. ........................................ 30/114; 30/266
[58] Field of Search .......... 30/114, 193, 254, 266–270, 30/239; 81/106, 109, 382, 416

[56] References Cited

U.S. PATENT DOCUMENTS

| | | | |
|---|---|---|---|
| 590,528 | 9/1897 | Koch | 30/266 |
| 593,386 | 11/1897 | Williams | 30/114 |
| 1,802,906 | 4/1931 | Bryant | 30/266 |

*Primary Examiner*—Douglas D. Watts

[57] ABSTRACT

A scissor-like utensil for cutting and serving slices of cake and similar goods has a pair of planar blades and a pair of handles by means of which the blades can be manipulated. The handles are formed with longitudinal slots and overlain so that a connector can be fitted through the adjacent slots to join the handles. The connector defines a pivot connection which permits the blades to be moved between closed and open orientations suitable respectively for cutting and gripping a serving and for releasing the serving. In the closed orientation, forward edges of the blades are proximate and substantially parallel, defining essentially a V-shaped structure corresponding to the shape of the serving to be cut, and a predetermined angle is formed between the blades which essentially determines the size of the serving. The pivot connection can be displaced and locked at intervals along the handles in such a manner that the angle formed between the blades can be varied to adjust serving size while maintaining the proximate relationship between the forward edges of the blades in the closed orientation.

10 Claims, 4 Drawing Sheets

UTENSIL FOR CUTTING AND SERVING PASTRY AND OTHER FOOD PRODUCTS

FIELD OF THE INVENTION

The invention relates generally to utensils for cutting and serving slices of cake and other food products.

DESCRIPTION OF THE PRIOR ART

A variety of devices have been proposed for the purpose of cutting or serving foods.

Devices intended solely to cut food or simply to grip foods are known. For example, in U.S. Des. Pat. No. 248,271 to McGee, III, there are shown pie and cake cutting devices which have a closed cutting frame and sharpened lower edges. Scissor-like devices are known to be useful for gripping foods, and one such scissor-like mechanism is described in U.S. Pat. No. 3,361,468 to Case. Such devices are not, however, adapted for convenient cutting and serving of cakes and the like.

A number of devices have been proposed which can cut a slice of cake and which incorporate a spatula-like blade for purposes of supporting the cut cake slice. In U.S. Pat. No. 2,538,154 to Hannigan, for example, there is shown a device having a broad blade which can be used to cut or divide a cake, which can then be inserted beneath the serving to raise it and which has a manually-operable pushing mechanism which displaces the serving from the blade itself. These cutting and lifting functions have been more closely combined in a number of prior devices generally using a broad blade or spatula which inserts below a serving and distinct cutting blades which are then actuated to cut the serving, the cut serving then being properly positioned on the broad blade or spatula for removal. Exemplary device of this type are illustrated in U.S. Pat. Nos. 634,330 to Ganz, 2,182,726 to King et al and 2,800,714 to Evans Devices have been proposed which are designed not only to cut a cake sector but also to grip the sector immediately upon cutting for purposes of convenient serving. These have involved a unitary V-shaped blade which conveniently defines a serving with a typical sector shape. One such device is described in U.S. Pat. No. 2,264,486 to Smith et al and maybe seen to comprise a pair of separate handles, attached to ends of a unitary V-shaped blade, which can be drawn together after cutting of a cake slice to grip and retain the serving. The blade is formed of a resilient material and the two sections of the blade defining the V-shape tend to separate when the handles are no longer tightly gripped to release the cake slice. A shortcoming in such a device is that serving size cannot be adjusted in a very positive manner.

A similar device is described in U.S. Pat. No. 2,841,868 to O'Brian. This device once again has a unitary blade design in which the blade has an inherent spring quality. For purposes of permitting adjustment of serving size, the ends of the blade are formed with two transversely-directed slotted extension plates, the degree of overlapping of the two plates being determinative of the size of the portion cut. A handle with a threaded locking mechanism engages the two slots, clamping the extension plates to one another and effectively fixing the serving size. A similar device is described in U.S. Pat. No. 4,411,066 to Allahverdin except that a worm-gear type mechanism acting between the ends of the associated V-shaped blade permits adjustment of serving size. Although such devices permit adjustment of serving size, the adjustment mechanisms are complex as in the Allahverdin patent or do not lend themselves to positive gripping of a cut serving as in the O'Brian patent.

BRIEF SUMMARY OF THE INVENTION

In one aspect, the invention provides a utensil for cutting and serving slices of cake and similar goods. The utensil has first and second blades, each having a forward edge and an opposing rear edge portion. A pair of handles are attached respectively to the rear edge portions of the blades. A pivot connection is formed between the handles so that the blades can be conveniently moved between closed and open orientations appropriate respectively for cutting and gripping of a serving and for release of the serving where required. In the closed orientation, the forward edges of the blades are proximate and substantially parallel, and a predetermined angle is defined between the blades (effectively defining the size of the serving). In the open orientation, the forward edges of the blades are separated, releasing a serving. The pivot connection can be displaced and releasably fixed relative to the handles in such a manner that the angle formed between the blades in the closed orientation can be selectively varied while maintaining the proximity of the forward edges. Accordingly, serving sizes can be conveniently varied.

Various objects and advantages associated with the present invention will be described in greater detail below in connection with a preferred embodiment and other inventive aspects will be more specifically defined in the appended claims.

DESCRIPTION OF THE DRAWINGS

The invention will be better understood with reference to drawings in which.

DESCRIPTION OF PREFERRED EMBODIMENT

Figure 1:
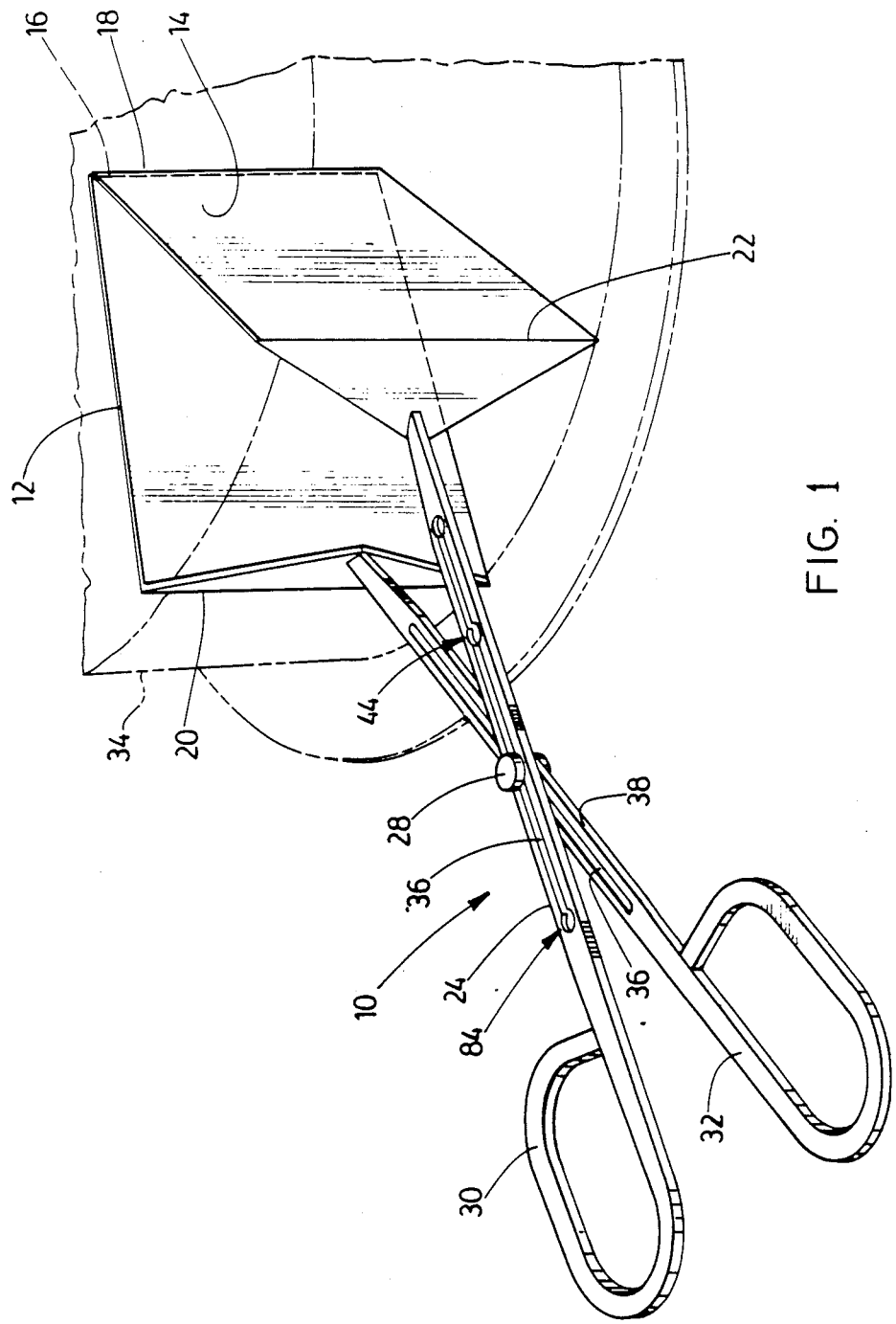
FIG. 1 is a perspective view of a cake-cutting utensil being used to cut a section of cake (illustrated in phantom outline)

In the drawings, there is shown a scissor-like cake cutting utensil generally indicated by the reference numeral 10. The utensil 10 may be seen to comprise a pair of generally planar blades 12, 14 having forward edges 16, 18 and opposing rear edge portions 20, 22 respectively, a pair of rigid handles 24, 26 attached to rear edge portions 20, 22 of the blades 12, 14, and a connector 28 which forms a movable pivot connection between the two handles 24, 26. The handles 24, 26 are terminated with scissor-like gripping portions 30, 32 which permit a user to conveniently manipulate the utensil 10, and more specifically, to open and close the blades 12, 14.

In FIG. 1, the blades 12, 14 are shown in a closed orientation. In such an orientation the forward edges 16, 18 of the blades 12, 14 are proximate and parallel and a predetermined angle is defined between the blades 12, 14. Essentially, a V-shaped structure is defined which can be drawn vertically into the cake 34 shown in phantom outline to cut uniform conventional V-shaped servings. The user can then draw the cake slice away and rotate the utensil 10 through 90 degrees about a horizontal axis to support the cake slice properly on the interior surface of one of the two blades 12, 14. Alternatively the user may draw the handles 24, 26 together more tightly to grip and lift the serving directly from the cake itself. For purposes of cutting a cake, the lower edges of the blades 12, 14 may be relatively blunt, but if considered appropriate for other food products the lower edges may be sharpened.

Figure 2:
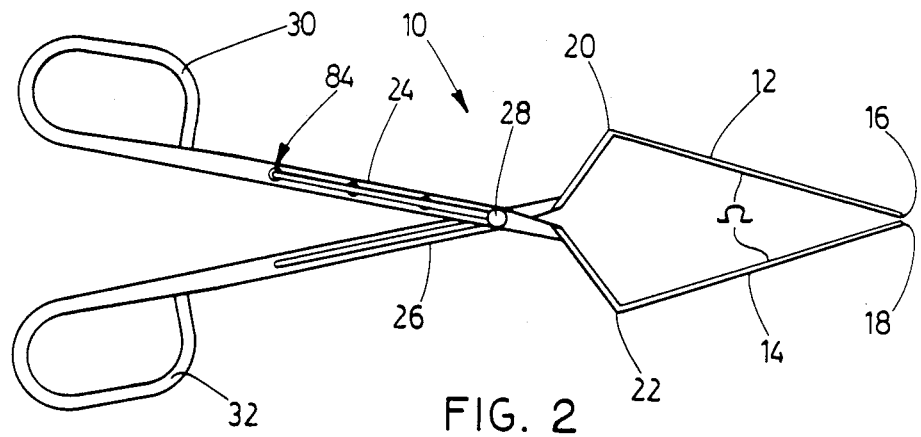
FIGS. 2 and 3 show the utensil with blades respectively in a closed orientation corresponding to the smallest serving size handled by the utensil and an open position suitable for releasing such a serving.
Figure 3:
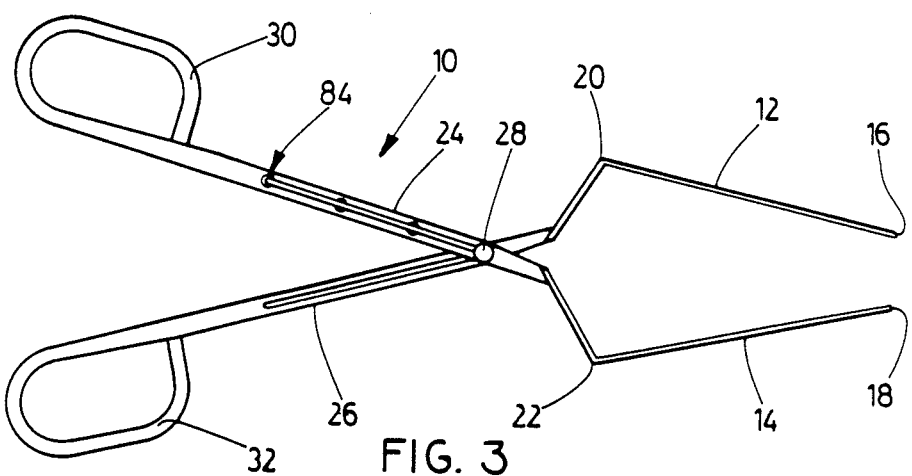
Figure 4:
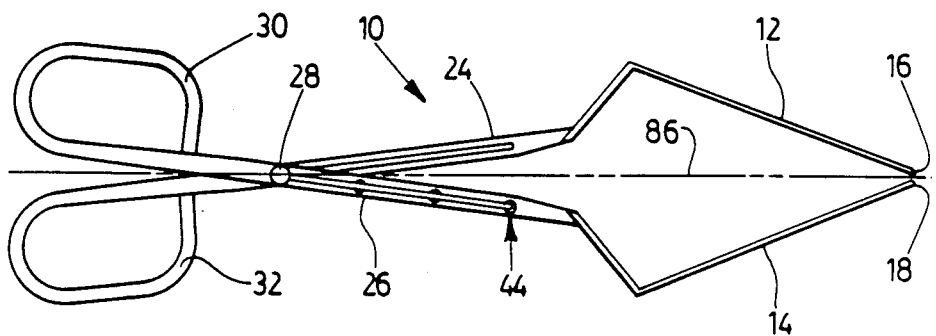
FIG. 4, shows the utensil adjusted to cut and handle the largest serving size associated with the utensil.

In FIG. 2, the blades 12, 14 are shown in another one of four possible closed orientations. In this orientation, the blades 12, 14 define a predetermined angle which has been more specifically indicated with the reference character $\Omega$. This angle is the smallest of four possible angles formed between the blades 12, 14 in their cutting orientation, and consequently corresponds to the smallest serving which can be cut and handled by this particular embodiment of the invention. In FIG. 3, which corresponds to the same location of the pivot connection between the handles 24, 26 as in FIG. 2, the handles 24, 26 have been spread or more precisely pivoted away from one another, and the forward edges 16, 18 of the blades 12, 14 have consequently been separated. Such an open orientation may be assumed when the serving is finally released where required.

The connector 28 may be displaced longitudinally relative to both handles 24, 26 for purposes of adjusting the angle formed between blades 12, 14 in their closed orientation. To that end, the handles 24, 26 are formed respectively with longitudinal slots 36, 38 and each of the handles 24, 26 has a plurality of distinct positions along its associated slot at which the connector 28 may be properly seated and retained against displacement. The handle 24 is typical and the associated slot 36 may be seen to be accessible at inner and outer handle surfaces 40, 42, permitting passage of the connector 28 through the handle 24. At regularly spaced intervals along the outer surface 42, the handle 24 has four recesses of a generally circular configuration, these recesses being intersected by the slot 36 whereby each recess appears to comprise two distinct part-circular sections, one disposed on either side of the slot 36. This arrangement is most apparent in FIG. 5 where a particular one of the recesses identified with the reference numeral 44 is illustrated. Accordingly, as the connector 28 is displaced along the handles 24, 26, in a manner described more fully below, the connector 28 can be conveniently engaged with the recesses.

Figure 5:
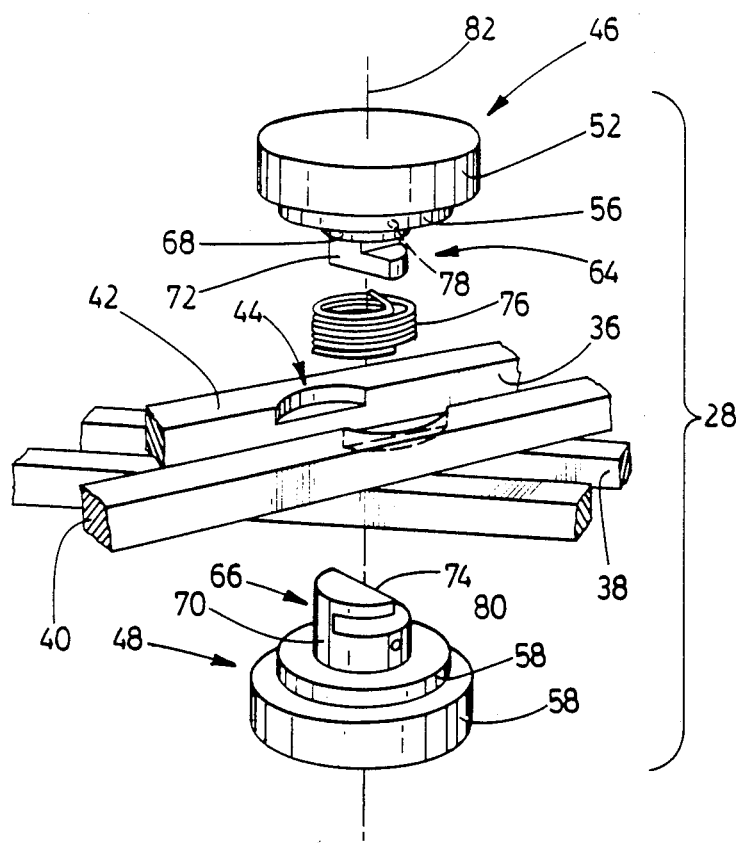
FIG. 5 is a fragmented perspective view illustrating a sliding connector which forms a pivoting connection between two handles associated with the utensil.

The manner in which the connector 28 is adapted to seat in the recesses associated with the handles 24, 26 to define a pivot connection is best understood with reference to FIG. 5 where the connector 28 is shown positioned at the handle recess 44. The connector 28 may be seen to comprise a pair of abutment heads 46, 48 which seat respectively in the recess 44 and a corresponding, registered recess 50 (shown in FIGS. 6–8). The abutment heads 46, 48 have outer gripping portions 52, 54, respectively, of generally circular shape which can be manipulated with a user's fingers to engage and disengage the abutment heads 46, 48 from their associated handles. The abutment heads 46, 48 are machined to have inner circular seating portions 56, 58, respectively, which conform in shape to the circular recesses 44, 50 and seat therein with the outer gripping portions 52, 54 abutted against the outer surfaces of the handles (as in FIGS. 6 and 7). The connector 28 includes what may be regarded as a two-part intermediate connector portion which serves to releasably join the two abutment heads 46, 48. This intermediate connector portion consists of a first part 64 machined with the inner seating portion 56 of the abutment head 46 and a second identical part 66 machined with the inner seating portion 58 of the abutment head 48. The parts 64, 68 comprise respectively cylindrical bases 68, 70 with a circular cross-section and upstanding portions 72, 74 of generally cylindrical shape and near half-circular cross-section. A cylindrical portion (not indicated) of near quarter-circular cross-section has in effect been removed from each of the upstanding portion 72, 74 immediately adjacent the associated base so that the two parts 64, 66 can be interlocked. A coil spring 76 whose ends are retained in holes 78, 80 formed in the base portions 68, 70 of the two parts 64, 66 serves as a biasing means normally urging the heads 46, 48 towards one another along a pivot axis 82 extending centrally through the two parts 64, 66.

Figure 6:
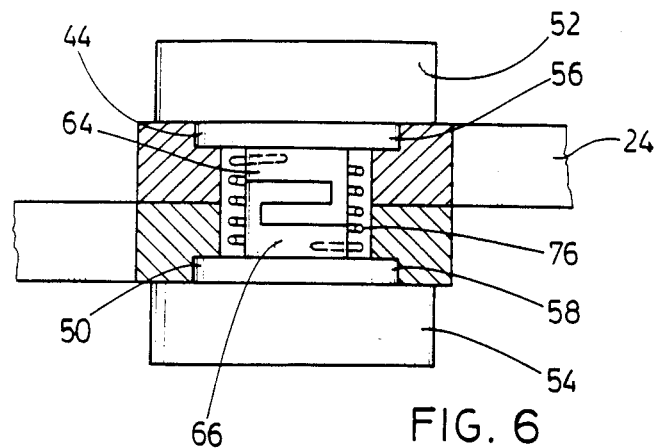
FIGS. 6–8 are fragmented views in partial cross-section detailing the relationship between the connector and the two handles and more specifically showing how the connector can be engaged with and disengaged from the handles.
Figure 7:
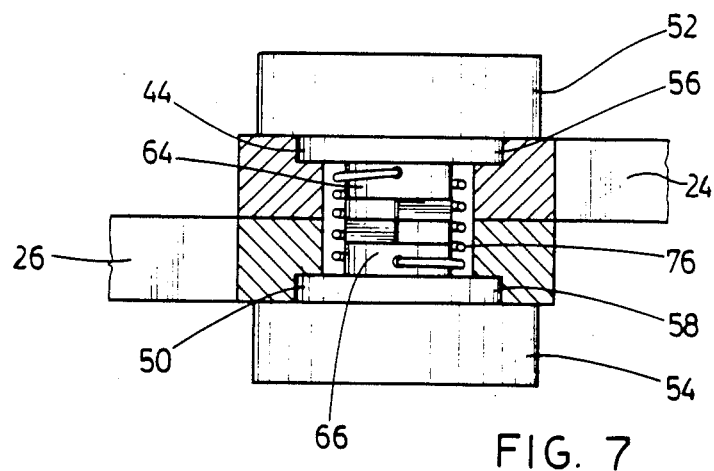
Figure 8:
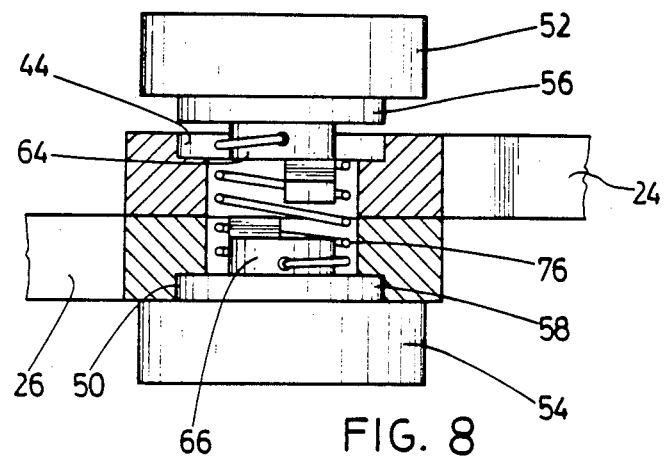

As apparent in FIG. 5, the required pivot connection is formed at a point where the two handles 24, 26 are overlain by one another, placing their inner surfaces in proximity, and one slot 36 is overlain with the other slot 38. The head 46 is seated in the recess 44 of the handle 24; while the other head 48 is seated in the registered recess 50 in the other handle 26. The two parts 64, 66 of the intermediate connector portion, located within the slots 36, 38, are interlocked to preventing separation of the heads 46, 48. This orientation is illustrated in FIG. 6. To permit displacement of the connector 28 from the position illustrated (which position is characteristic of the handles and blade orientations of FIGS. 2 and 3), the heads 46, 48 are rotated relative to one another through about 90 degrees thereby rotating the two interlocking parts 64, 66 about the pivot axis 82 through a corresponding angle. The resultant orientation of the two parts 64, 66 is illustrated in FIG. 7 where the two parts 64, 66 may now be seen to be separated. The user then draws the abutment head 46 clear from the recess 44 (against the influence of the biasing spring 76) to the orientation of FIG. 8. The handle 24 can then be displaced relative to the abutment head 46 effectively displacing the abutment head along the slots 36 until located, for example, at the handle recess 84 adjacent the handle gripping portion 30. The abutment head 46 will tend to seat loosely into the handle recess 84 under the influence of the spring 76. A similar procedure may then be followed with respect to the abutment head 48 to remove it from the recess 50, to effectively displace the connector 28 relative to the slot 38 and to locate the abutment head 48 in the corresponding recess (not illustrated) immediately adjacent the handle gripping portion 32. The connector 28 may then locked in place by reversing the process illustrated in FIGS. 6–8, namely, by pressing the heads 46, 48 together to seat them completely in the recesses with the incidental effect of displacing the two parts 64, 66 of the intermediate connection portion towards one another along the central connector pivot axis 82 with which they are aligned, and by then rotating the heads 46, 48 through 90 degrees in a direction opposite to that used to disengage the parts 64, 66 thereby interlocking the two parts 64, 66. This results in the blade and handle orientation illustrated in FIG. 5 in which the largest possible angle is formed between the two blades 12, 14, corresponding to the largest serving that can be cut and handled.

It should be noted that in the orientation of FIG. 5, the forward edges 16, 18 of the two blades 12, 14 remain proximate despite the increase in serving size to be cut and handled. This is due to the fact that in this particular embodiment of the invention there are only four proper seating positions for the connector 28, each of these seating positions being substantially coincident with a bisector 86 of the angle formed between the blades 12, 14. The displacement of the connector 28 along the said bisector 86 (ignoring intermediate positions assumed until final seating and locking of the connector 28) results in an effective rotation of the blades 12, 14 about an imaginary axis at the vertex of the V-shape they define, thereby not requiring separation of the blades 12, 14 themselves. It will be appreciated, however, that the utensils of the invention are simple tools and that some differences in the separation between the forward edges of the blades 12, 14 in their various closed orientations, as for example in the four closed orientations assumed in the preferred embodiment, would normally be expected unless efforts were made to construct a precision tool. For practical purposes such precision is not required.

It will be appreciated that a particular embodiment of the invention has been described, and that modifications may be made therein embodying the principles of construction and operation taught herein without departing from the spirit of the invention or the scope of the appended claims.

I claim:

1. A utensil for cutting and serving slices of cake and similar goods, comprising:
   a first planar blade having a forward edge and an opposing rear edge portion;
   a second planar blade having a forward edge and an opposing rear edge portion;
   a first handle attached to the rear edge portion of the first blade and having a first slot;
   a second handle attached to the rear edge portion of the second blade and having a second slot;
   the handles being overlayed such that the first slot and the second slot are overlayed;
   a releasable connector extending through the first and second slots and forming a releasable pivot connection between the handles such that the first and second blades can be pivoted by means of the handles between a closed orientation in which the blades together have a generally V-shaped cross-section with the forward edges of the blades proximate and substantially parallel and defining the vertex of the V-shaped cross-section and in which a predetermined angle is formed between the blades and an open orientation in which the forward edges of blades are separated;
   the connector being displaceable when released along both the first and second slots to form the releasable pivot connection at different locations on the handles such that the predetermined angle can be selectively varied while maintaining the proximity of the forward edges of the blades in the closed orientation.

2. A utensil as claimed in claim 1 in which the connector comprises a first abutment head located at an outer surface of the first handle, a second abutment head located at an outer surface of the second handle, and an intermediate portion releasably connecting the first and second abutment heads and extending through the first and second slots.

3. A utensil as claimed in claim 2 in which:
   the connector has a pivot axis;
   the intermediate portion comprises a first part attached to the first abutment head and a second separate part attached to the second abutment head, the first and second parts being aligned along the pivot axis, the first and second parts being shaped to interlock when displaced towards one another along the pivot axis and rotated relative to one another about the pivot axis through a first angle and to disengage when rotated relative to one another through an angle opposite to the first angle and displaced away from one another along the pivot axis; and,
   the connector comprises biasing means located within the first and second slots and acting between the first and second abutment heads for urging the abutment heads towards one another.

4. A utensil as claimed in claim 2 in which:
   the first handle has a first plurality of recesses formed at predetermined locations in the outer surface of the first handle, each of the first plurality of recesses being intersected by the first slot, each of the first plurality of recesses being shaped to seat the first abutment head and to retain the first abutment head when seated in the recess against movement along the outer surface of the first handle; and,
   the second handle has a second plurality of recesses formed at predetermined locations in the outer surface of the second handle, each of the second plurality of recesses being intersected by the second slot, each of the second plurality of recesses being shaped to seat the second abutment head and to retain the second abutment head when seated in the recess against movement along the outer surface of the second handle.

5. A utensil as claimed in claim 4 in which:
   the connector has a pivot axis;
   the intermediate portion comprises a first part attached to the first abutment head and a second separate part attached to the second abutment head, the first and second parts being aligned along the pivot axis, the first and second parts being shaped to interlock when displaced towards one another along the pivot axis and rotated relative to one another about the pivot axis through a first angle and to disengage when rotated relative to one another through an angle opposite to the first angle and displaced away from one another along the pivot axis; and,
   the connector comprises biasing means located within the first and second slots and acting between the first and second abutment heads for urging the abutment heads towards one another.

6. A utensil for cutting and serving slices of cake and similar goods, comprising:
   a first planar blade having a forward edge and an opposing rear edge portion;
   a second planar blade having a forward edge and an opposing rear edge portion;

a first handle attached to and extending rearwardly from the rear edge portion;

a second handle attached to and extending rearwardly from the rear edge portion of the second blade;

a releasable connector forming a releasable pivot connection between the handles such that the blades can be pivoted by means of the handles between a closed orientation in which the blades together have a generally V-shaped cross-section with the forward edges of the blades proximate and substantially parallel and defining the vertex of the V-shaped cross-section and in which a predetermined angle is formed between the blades and an open orientation in which the forward edges of blades are separated;

the connector comprising means retaining the connector to the handles when released and the connector being displaceable when released relative to both handles for location on a predetermined axis of the utensil which substantially bisects the predetermined angle whereby the angle formed between the blades can be selectively varied while maintaining the proximity of the forward edges of the first and second blades in the closed orientation.

7. A utensil as claimed in claim 6 in which:

the first handle has an inner surface, an opposing outer surface and a first slot accessible at the inner and outer surfaces associated with the first handle;

the second handle has an inner surface, an opposing outer surface and a second slot accessible at the inner and outer surfaces associated with the second handle;

the first handle overlays the second handle such that the inner surfaces of the first and second handles are proximate and the first slot overlays the second slot at the pivot connection;

the connector has a first abutment head located at the outer surface of the first handle, a second abutment head located at the outer surface of the second handle, and an intermediate portion connecting the first and second abutment heads and extending through the first and second slots.

8. A utensil as claimed in claim 7 in which:

the connector has a pivot axis;

the intermediate portion comprises a first part attached to the first abutment head and a second separate part attached to the second abutment head, the first and second parts being aligned along the pivot axis, the first and second parts being shaped to interlock when displaced towards one another along the pivot axis and rotated relative to one another about the pivot axis through a first angle and to disengage when rotated relative to one another through an angle opposite to the first angle and displaced away from one another along the pivot axis; and, the connector comprises biasing means located within the first and second slots and acting between the first and second abutment heads for urging the abutment heads towards one another.

9. A utensil as claimed in claim 7 in which:

the first handle has a first plurality of recesses formed at predetermined locations in the outer surface of the first handle, each of the first plurality of recesses being intersected by the first slot, each of the first plurality of recesses being shaped to seat the first abutment head and to retain the first abutment head when seated in the recess against movement along the outer surface of the first handle; and, the second handle has a second plurality of recesses formed at predetermined locations in the outer surface of the second handle, each of the second plurality of recesses being intersected by the second slot, each of the second plurality of recesses being shaped to seat the second abutment head and to retain the second abutment head when seated in the recess against movement along the outer surface of the second handle.

10. A utensil as claimed in claim 9 in which:

the connector has a pivot axis;

the intermediate portion comprises a first part attached to the first abutment head and a second separate part attached to the second abutment head, the first and second parts being aligned along the pivot axis, the first and second parts being shaped to interlock when displaced towards one another along the pivot axis and rotated relative to one another about the pivot axis through a predetermined angle and to disengage when rotated relative to one another through an angle opposite to the predetermined angle and displaced away from one another along the pivot axis; and, the connector comprises biasing means located within the first and second slots and acting between the first and second abutment heads for urging the abutment heads towards one another.

* * * * *